(12) United States Patent
Hogan et al.

(10) Patent No.: US 12,024,368 B2
(45) Date of Patent: Jul. 2, 2024

(54) LINEAR MOTOR CONVEYOR SYSTEM FOR CLEAN/ASEPTIC ENVIRONMENTS

(71) Applicant: ATS Corporation, Cambridge (CA)

(72) Inventors: Roger Hogan, Cambridge (CA); Albert Kleinikkink, Cambridge (CA); Michael Barclay, Cambridge (CA); Blake Lambert, Cambridge (CA); Martin Juritsch, Cambridge (CA)

( * ) Notice: Subject to any disclaimer, the term of this patent is extended or adjusted under 35 U.S.C. 154(b) by 0 days.

(21) Appl. No.: 18/194,834

(22) Filed: Apr. 3, 2023

(65) Prior Publication Data

US 2023/0234784 A1 Jul. 27, 2023

Related U.S. Application Data

(63) Continuation of application No. 17/481,547, filed on Sep. 22, 2021, now Pat. No. 11,618,632.

(60) Provisional application No. 63/083,255, filed on Sep. 25, 2020.

(51) Int. Cl.
*B65G 23/23* (2006.01)

(52) U.S. Cl.
CPC ................... *B65G 23/23* (2013.01)

(58) Field of Classification Search
CPC ........ B65G 21/00; B65G 21/08; B65G 21/10; B65G 23/23
USPC ........................ 198/619, 860.3, 860.5, 861.1
See application file for complete search history.

(56) References Cited

U.S. PATENT DOCUMENTS

| | | | | |
|---|---|---|---|---|
| 2,837,203 A | * | 6/1958 | Reeser | B65G 19/28 198/860.4 |
| 3,878,936 A | * | 4/1975 | Niggemyer | B65G 21/08 285/35 |
| 4,090,604 A | * | 5/1978 | Reifert | B65D 90/54 198/860.5 |
| 4,093,066 A | * | 6/1978 | Mitchell | B65G 21/08 198/860.4 |
| 5,129,508 A | | 7/1992 | Shelstad | |
| 5,454,328 A | * | 10/1995 | Matsuzaki | E01B 25/24 105/156 |

(Continued)

FOREIGN PATENT DOCUMENTS

| | | |
|---|---|---|
| DE | 102018209727 A1 | 12/2019 |
| EP | 3255765 A1 | 12/2017 |

OTHER PUBLICATIONS

Extended European Search Report, European Patent Office, on corresponding EP Application No. 21198722.7, dated Feb. 23, 2022.

*Primary Examiner* — Douglas A Hess
(74) *Attorney, Agent, or Firm* — Amarok IP Inc.; Neil W. Henderson

(57) ABSTRACT

A linear motor conveyor system including: a plurality of track sections including a track and an interior area; a track cover covering the track of the plurality of track sections; a top plate covering at least a portion of the interior area of the plurality of track sections; at least one top cover covering at least a portion of the top plate and any uncovered portions of the interior area; and a plurality of gaskets providing a seal between the track cover and track, top cover and top plate such that the interior area of the plurality of track sections are sealed. The track cover may be a strong, flexible material configured to wrap along or around the track to cover any joints between track sections and provide a sealed, easy to clean cover.

15 Claims, 16 Drawing Sheets

(56) References Cited

U.S. PATENT DOCUMENTS

| | | | | |
|---|---|---|---|---|
| 5,755,246 | A * | 5/1998 | Carl | B05B 16/90 |
| | | | | 134/131 |
| 5,947,266 | A * | 9/1999 | Rionde | B65G 21/08 |
| | | | | 198/860.3 |
| 6,626,285 | B2 | 9/2003 | Enomoto | |
| 7,588,410 | B2 | 9/2009 | Hinsley | |
| 7,624,686 | B2 * | 12/2009 | Li | B60L 13/04 |
| | | | | 104/281 |
| 7,735,632 | B1 * | 6/2010 | Garlow | F16C 29/08 |
| | | | | 198/860.3 |
| 8,205,740 | B2 | 6/2012 | Dragon et al. | |
| 8,602,706 | B2 * | 12/2013 | Hofmeister | H01L 21/67742 |
| | | | | 414/217 |
| 8,827,069 | B2 * | 9/2014 | Freehill | B65G 15/26 |
| | | | | 198/588 |
| 8,919,543 | B2 | 12/2014 | Jorgensen et al. | |
| 9,139,369 | B2 * | 9/2015 | Williams | B65G 21/08 |
| 9,221,616 | B2 * | 12/2015 | Klassen | B65G 15/42 |
| 9,512,515 | B2 | 12/2016 | Chang et al. | |
| 10,336,559 | B2 | 7/2019 | Koga et al. | |
| 10,486,910 | B2 | 11/2019 | Kahrger et al. | |
| 10,723,561 | B1 | 7/2020 | Hoover | |
| 11,021,335 | B2 * | 6/2021 | Sinzenich | B65G 45/00 |
| 11,046,527 | B2 | 6/2021 | Herring, II et al. | |
| 11,190,086 | B2 * | 11/2021 | Grosskreuz | H02K 11/33 |
| 11,440,748 | B2 * | 9/2022 | Cameron | B65G 54/02 |
| 11,618,632 | B2 * | 4/2023 | Hogan | B65G 54/02 |
| | | | | 198/619 |
| 2016/0164395 | A1 | 6/2016 | Sommerhalter, Jr. et al. | |
| 2019/0375597 | A1 | 12/2019 | Kleinikkink et al. | |
| 2019/0389675 | A1 | 12/2019 | Kleinikkink et al. | |

\* cited by examiner

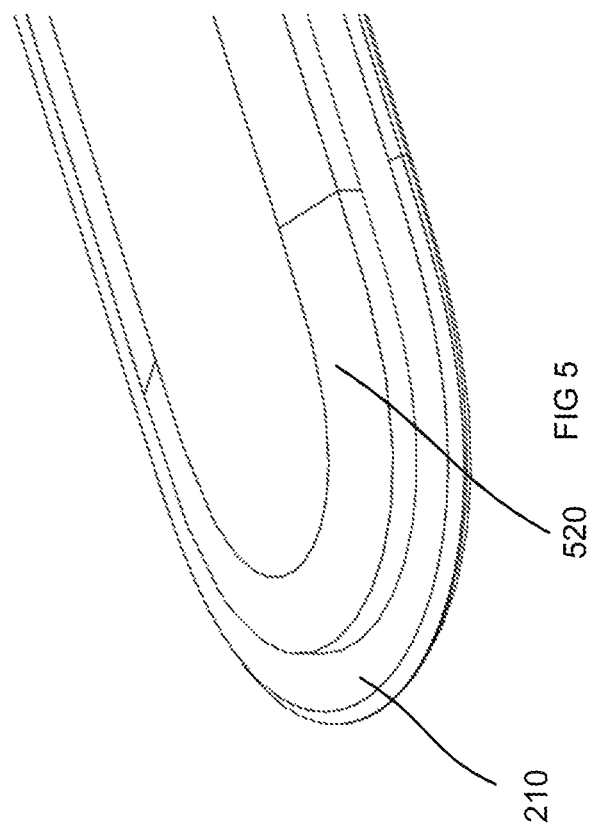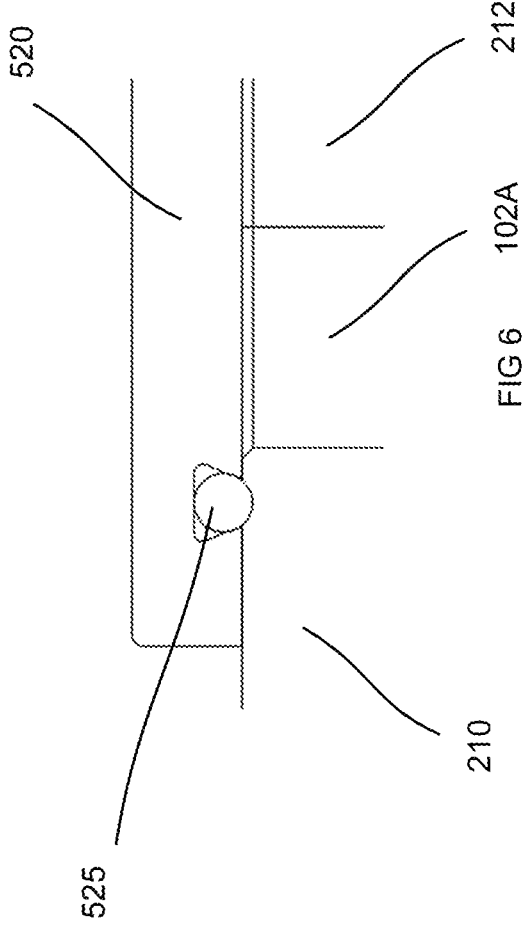

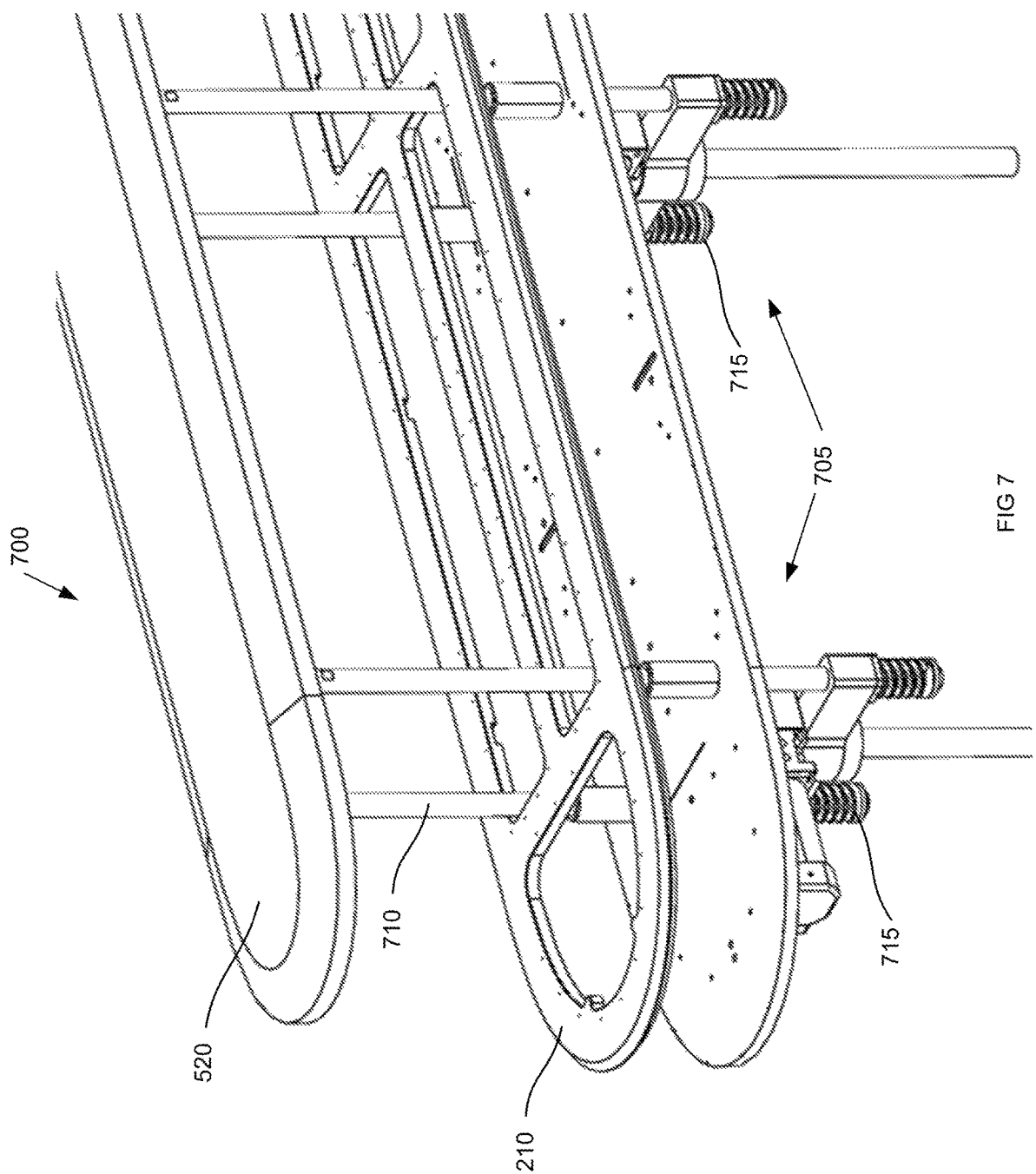

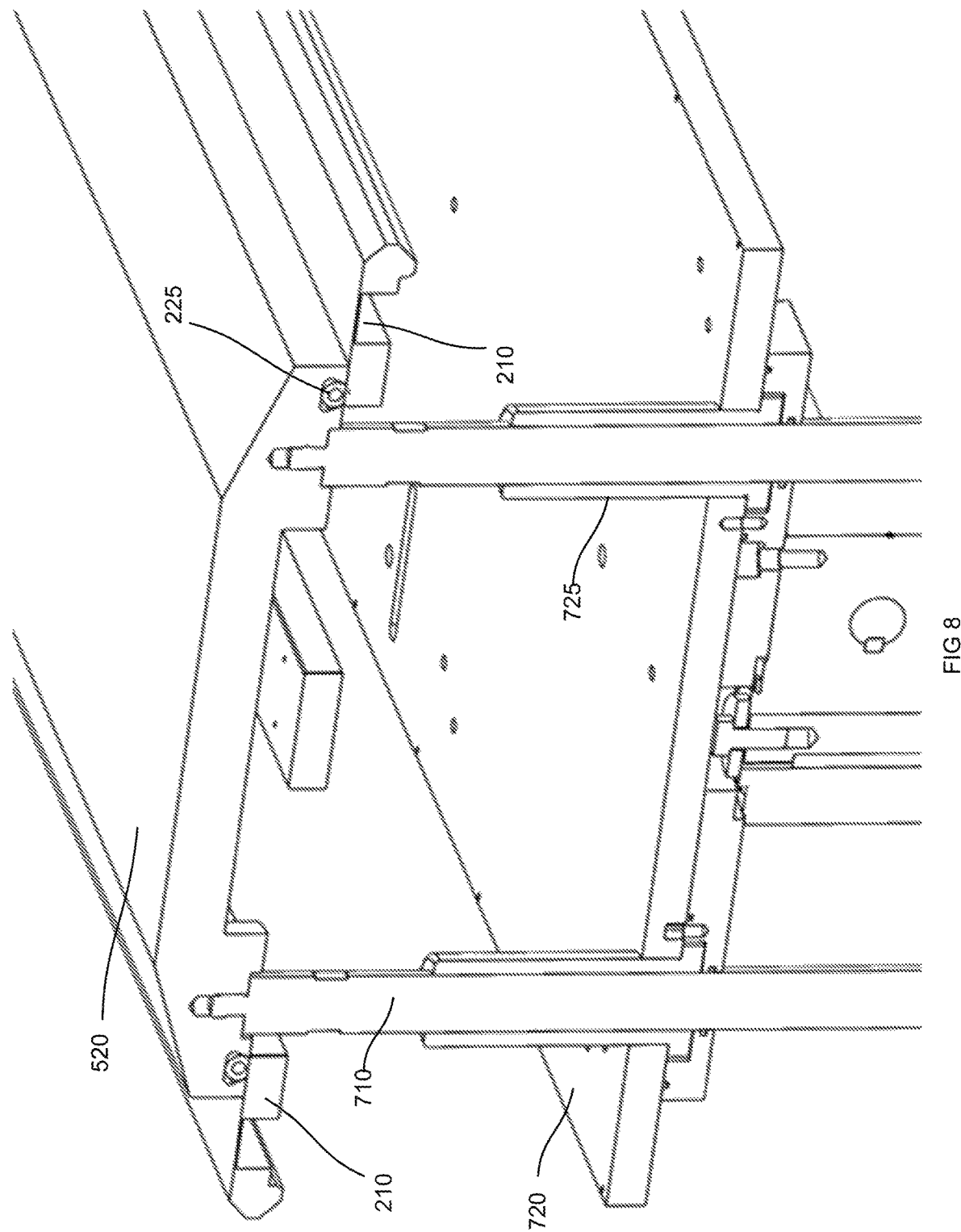

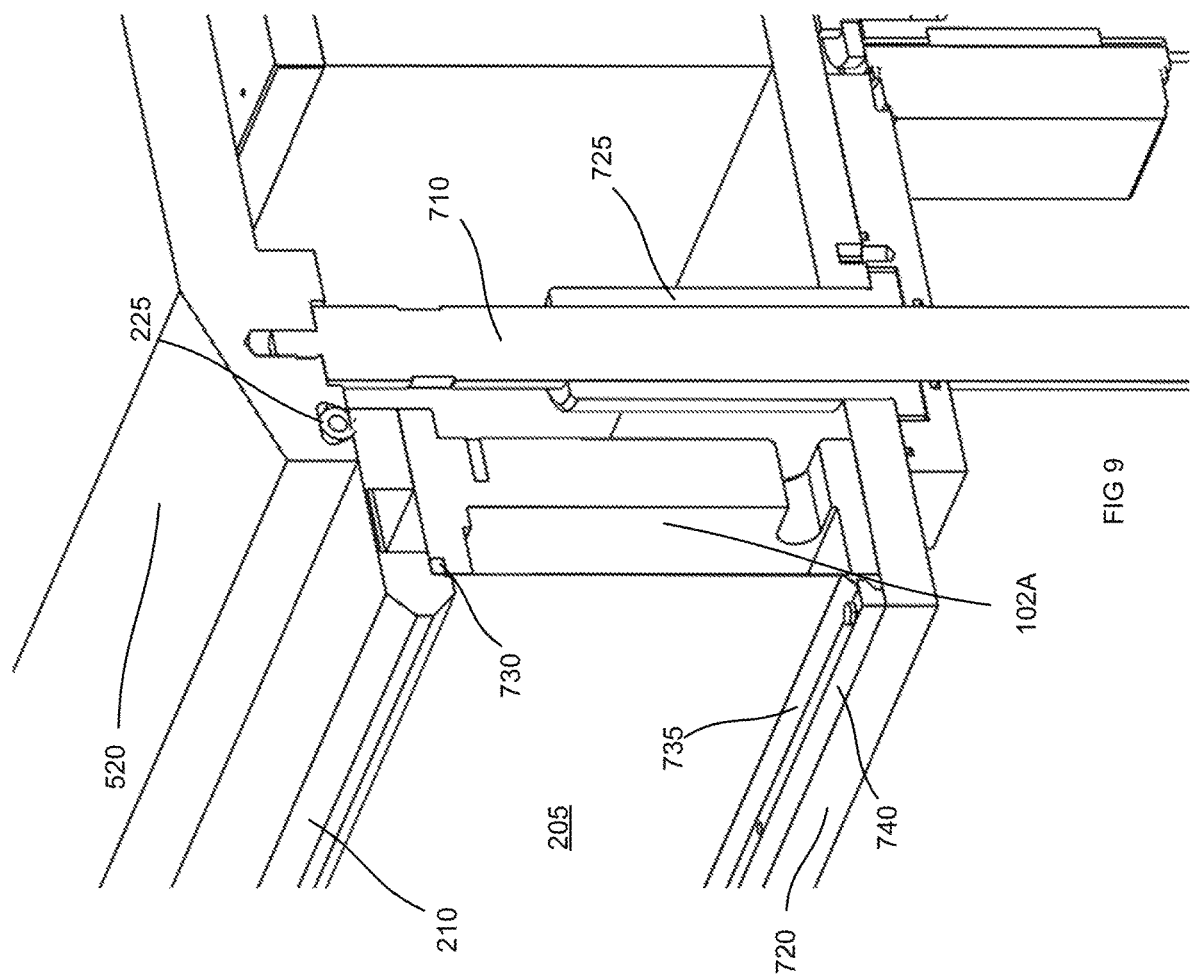

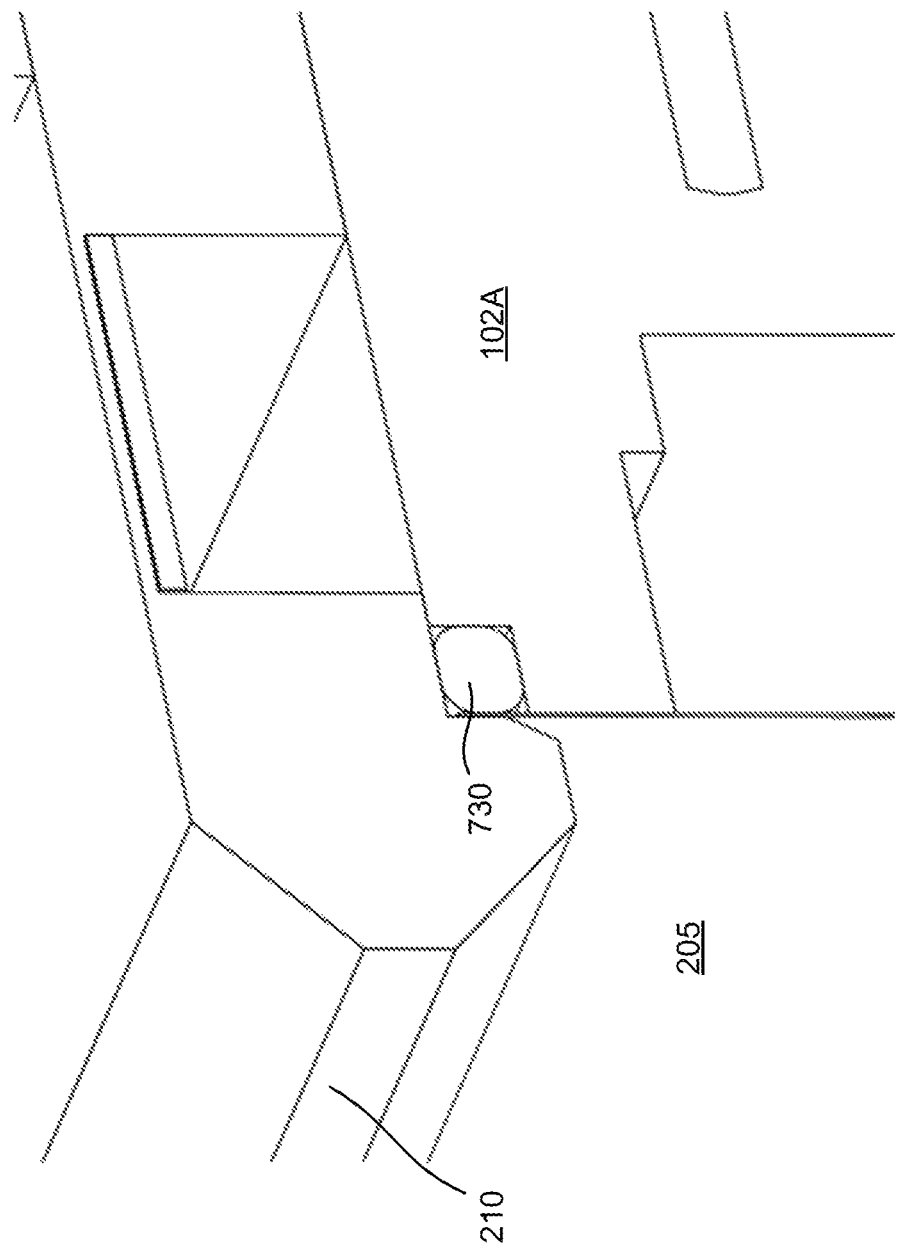

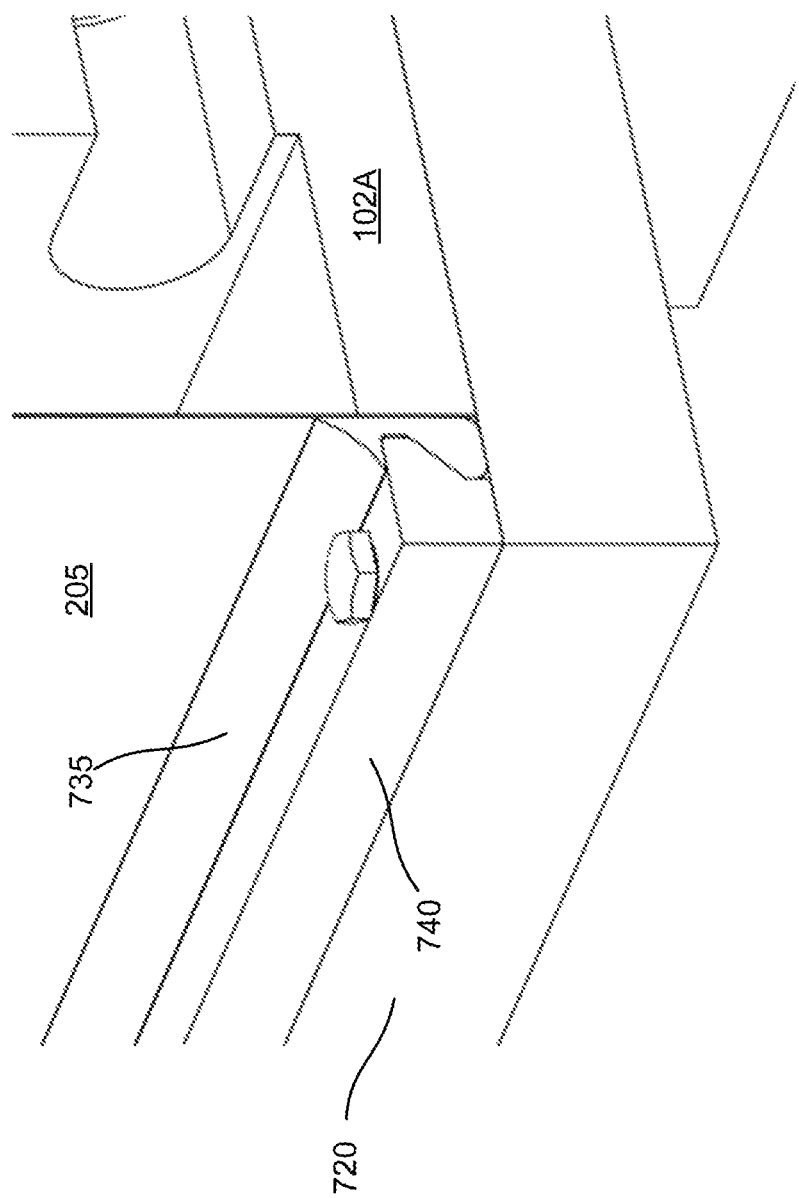

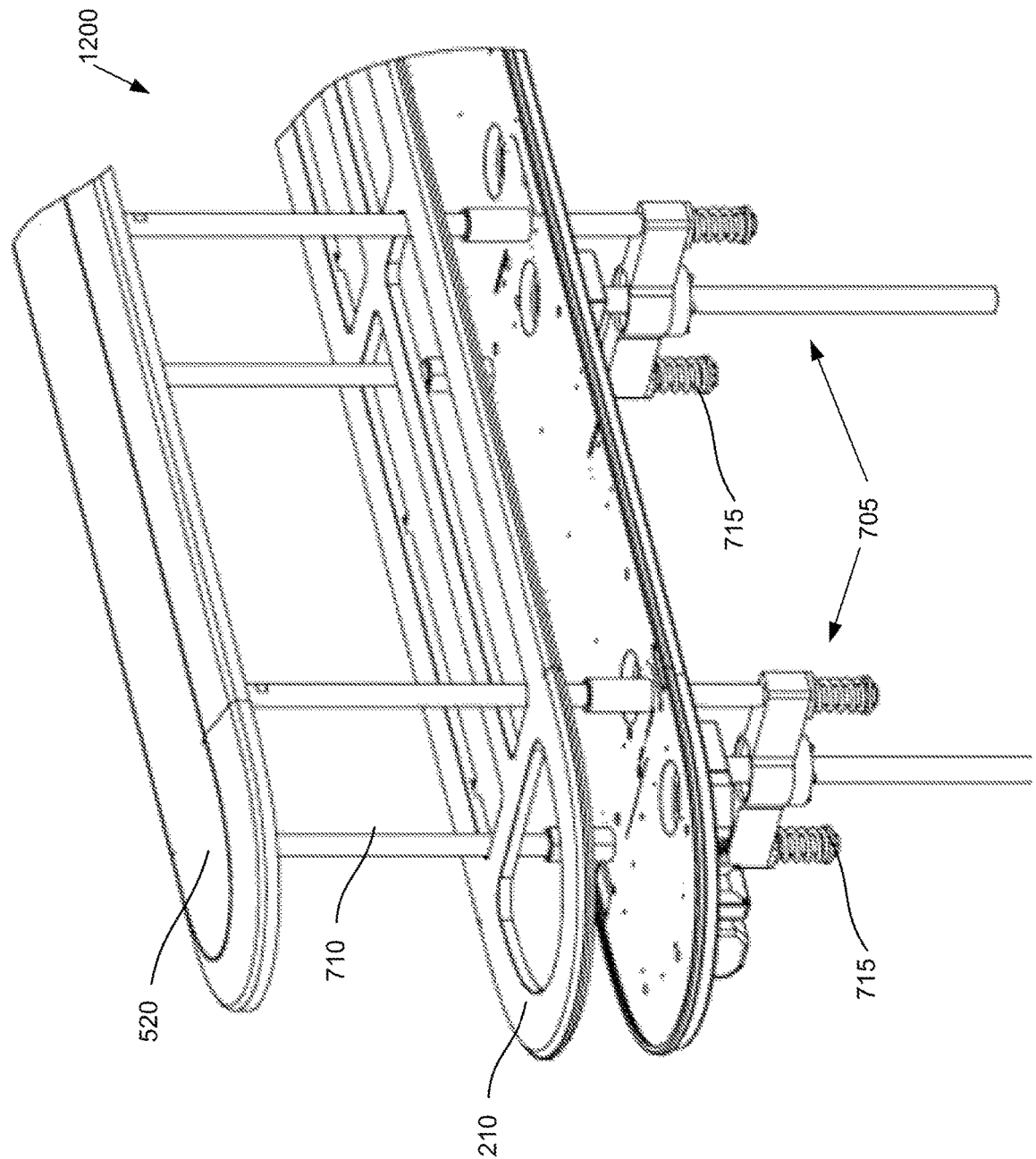

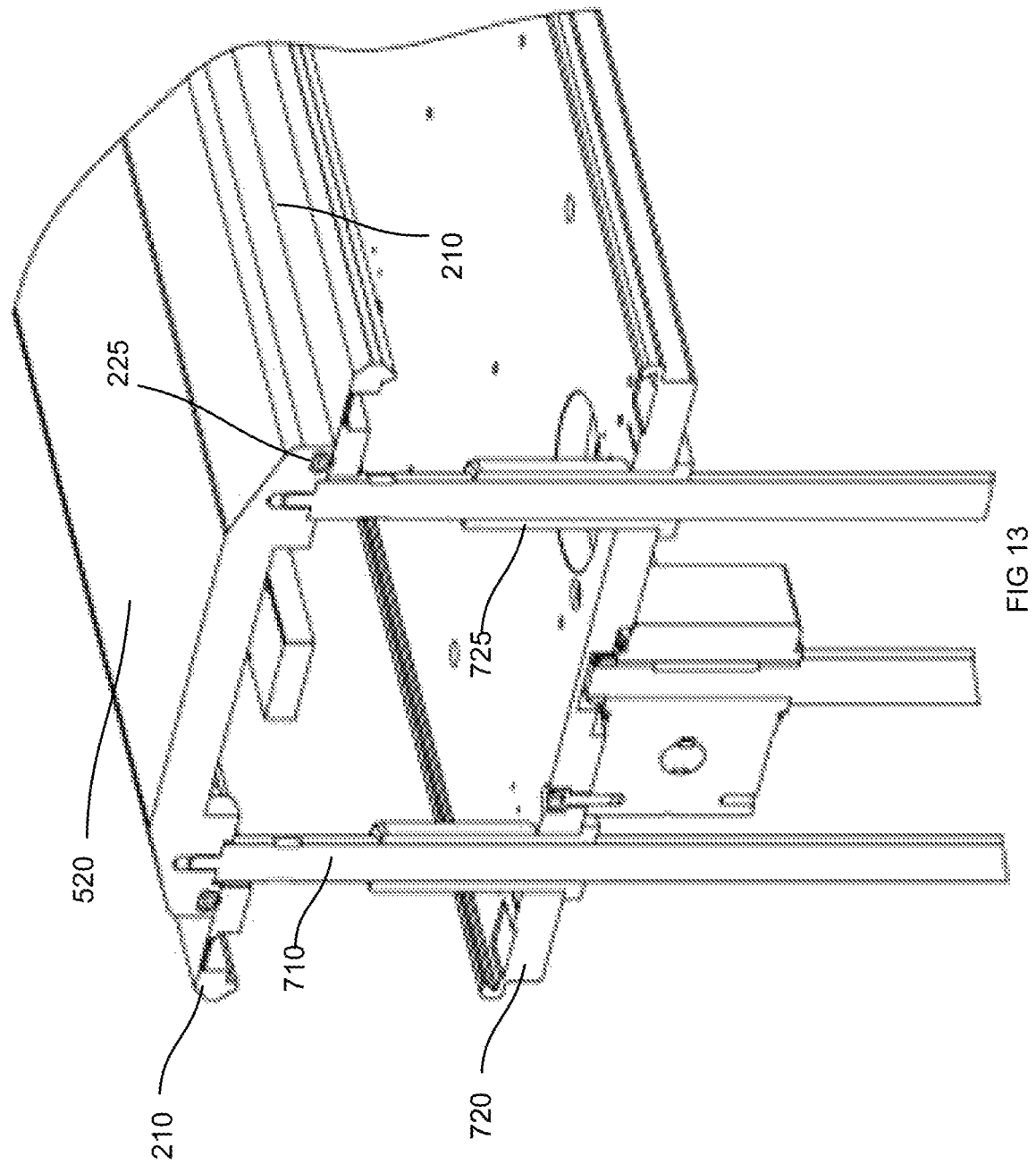

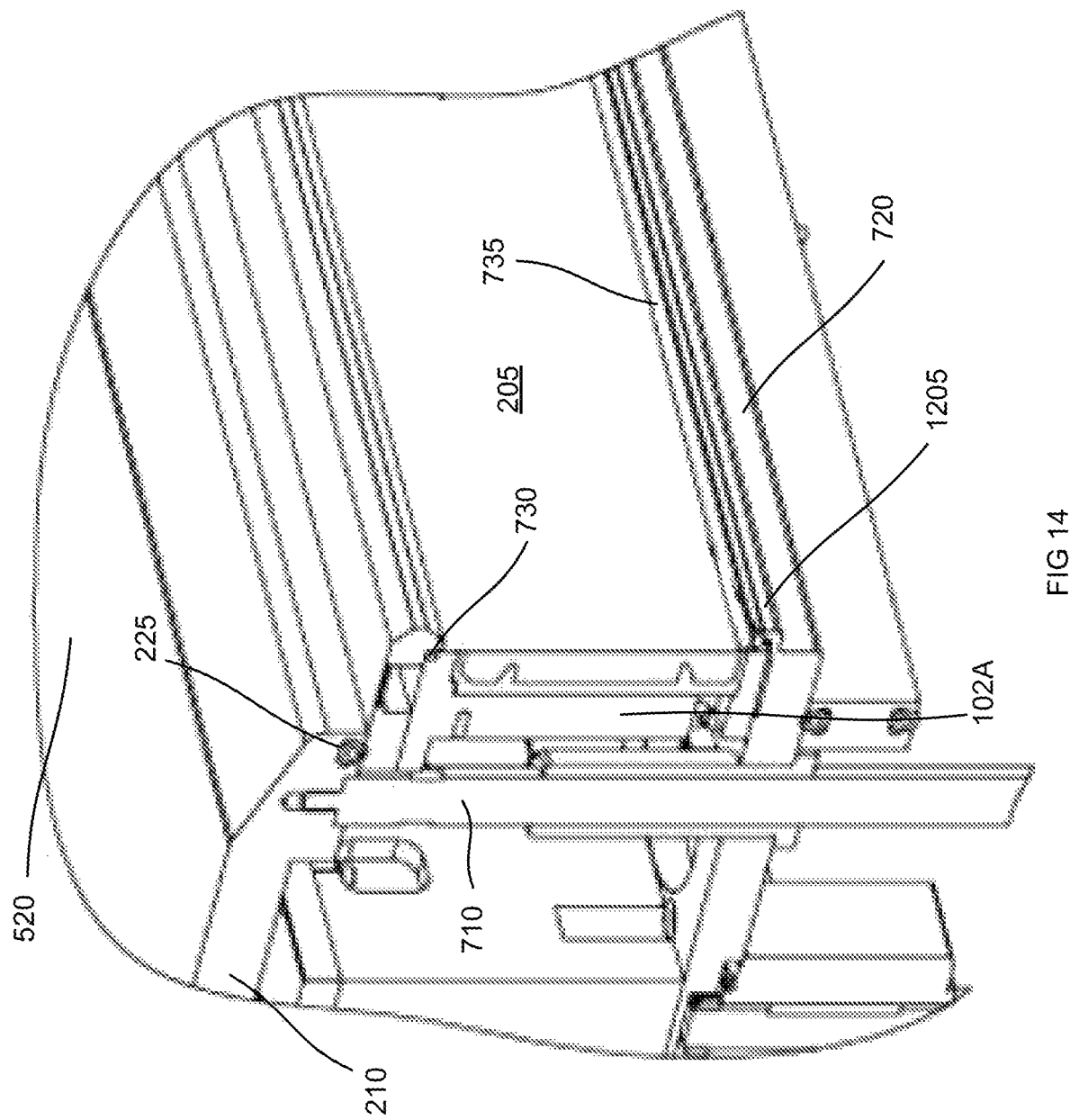

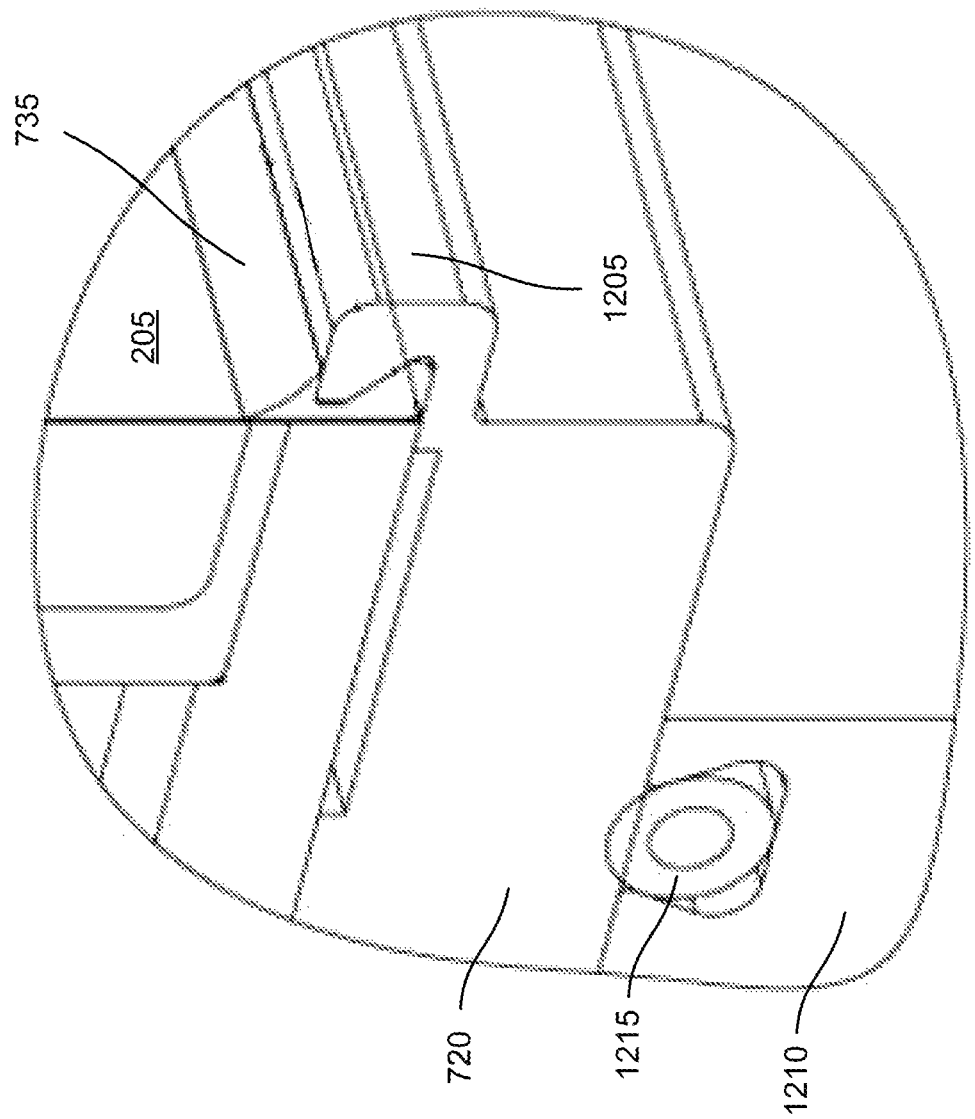

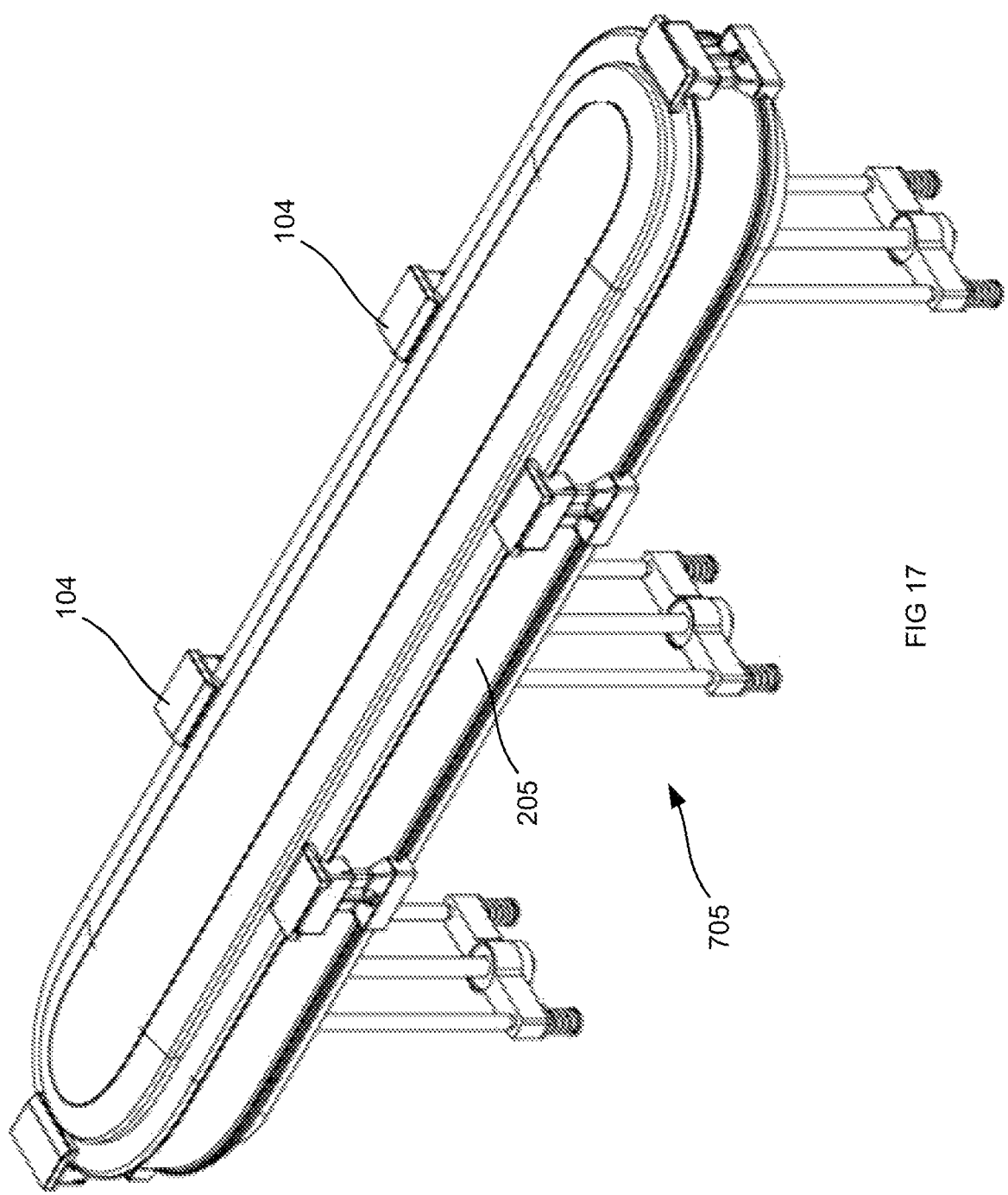

LINEAR MOTOR CONVEYOR SYSTEM FOR CLEAN/ASEPTIC ENVIRONMENTS

RELATED APPLICATIONS

The present disclosure is a continuation of U.S. patent application Ser. No. 17/481,547, filed Sep. 22, 2021, which claims priority from U.S. Provisional Patent App. No. 63/083,255, filed Sep. 25, 2020, the content of which are hereby incorporated herein by reference.

FIELD

The present disclosure relates generally to linear motor conveyor systems. More particularly, the disclosure relates to a linear motor conveyor which may be configured for use in an environment that requires reduced levels of contaminants such as a clean or aseptic environment.

BACKGROUND

In conventional linear motor conveyors or systems, a moving element is controlled to move along a track by electromotive force. In a moving magnet linear motor, the moving element typically includes a magnet that interacts with the magnetic field produced from stationary coils in the track to propel the moving element along the track.

Conventional linear motor conveyor systems typically do not operate well in clean, aseptic or sterile environments (sometimes called "clean rooms" or the like and referred to herein as "aseptic environments"). Aseptic environments can be important to produce products such as pharmaceuticals, medical products, electronics or the like, which typically require aseptic environments in which contaminates are reduced, controlled or eliminated during manufacturing.

Conventional linear motor conveyor systems generally do not operate well in aseptic environments because conventional linear motor conveyor systems often have components that cause the formation, collection or propagation of contaminates, for example from mechanical friction, collection in cracks and crevices between components, or the like. Contaminants can include dust, debris, bacteria, and other particulates of various types and the like and can be very problematic in aseptic environments.

Further, conventional linear motor conveyor systems can have sensitive electrical and mechanical parts that could be adversely affected by cleaning products and processes such as those used in aseptic environments.

In view of at least the above considerations there is a need for an improved linear motor conveyor system and, in particular, for a linear motor conveyor system for use in aseptic environments.

SUMMARY

According to one aspect herein, there is provided a linear motor conveyor system including: a plurality of track sections including a track and an interior area; a track cover covering the track of the plurality of track sections; a top plate covering at least a portion of the interior area of the plurality of track sections; at least one top cover covering at least a portion of the top plate and any uncovered portions of the interior area; and a plurality of gaskets providing a seal between the track cover and track, top cover and top plate such that the interior area of the plurality of track sections are sealed.

In some cases, the track cover may be a strong, flexible material configured to wrap along or around the track. In some cases, the track cover may be configured to cover any joints between track sections.

In some cases, the top plate is configured to cover an exterior of the interior area while leaving openings to allow access to the interior area.

In some cases, the top cover may be configured to cover one or more of the openings in the top plate and may be configured to compress one or more of the plurality of gaskets between the top cover and the top plate around the one or more openings being covered.

In some cases, the top plate may include an overhang that engages with one edge of the track cover and may be configured to compress one or more of the plurality of gaskets between the track cover and the top plate. In this case, the one of the plurality of gaskets may also be compressed between the track cover and the track.

In some cases, one or more of the plurality of gaskets may be configured to form a seal between an edge of the track cover and a base of the track section.

In some cases, the system may include an opening mechanism configured to open the top cover to allow for maintenance. In this case, the opening mechanism may include at least one piston provided to the top cover, wherein the piston can be raised and lowered to open the top cover.

According to another aspect herein, there is provided a linear motor conveyor system including: a base; a plurality of track sections mounted on the base, each track section includes a track and an interior area; a track cover covering the tracks of the plurality of track sections; a top plate covering at least a portion of the interior area of the plurality of track sections; at least one top cover covering at least a portion of the top plate and any uncovered portions of the interior area; a first gasket providing a seal between the top cover and top plate; a second gasket providing a seal between the top plate and the track cover; and a third gasket providing a seal between the track cover and base.

In some cases, the track cover may be a strong, flexible material configured to wrap along or around the track.

In some cases, the track cover may be configured to cover any joints between track sections.

In some cases, the top plate may be configured to cover a portion of the interior area while leaving openings to allow access to the interior area. In these cases, the top cover may be configured to cover one or more of the openings in the top plate and may be configured to compress the first gasket between the top cover and the top plate.

In some cases, the top plate may have an overhang that engages with one edge of the track cover and may be configured to compress the second gasket between the track cover and the top plate. In these cases, the second gasket may also be compressed between the track cover and the track.

In some cases, the third gasket may be configured to form a seal between an edge of the track cover and a base of the track section.

In some cases, the linear motor conveyor system may further include an opening mechanism configured to open the top cover to allow for maintenance. In these cases, the opening mechanism may include at least one piston provided to the top cover, wherein the piston can be raised and lowered to open the top cover.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 5 illustrates a situation where a top cover is configured to be contiguous and cover portions of the top plate and the interior of the conveyor system;

FIG. 6 illustrates a first gasket for providing a seal between the top cover and the top plate;

FIG. 7 illustrates a further embodiment of a conveyor system in which an opening mechanism is provided to allow access to an interior area of the conveyor system;

FIG. 8 illustrates a cross-section showing further detail of the opening mechanism of FIG. 7;

FIG. 9 illustrates another cross-section showing further detail of the conveyor system of FIG. 7;

FIG. 10 illustrates a more detailed view of a second gasket in the conveyor system of FIG. 7;

FIG. 11 illustrates a more detailed view of a third gasket in the conveyor system of FIG. 7;

FIG. 12 illustrates a further embodiment of a conveyor system similar to FIG. 7;

FIG. 13 illustrates a cross-section showing further detail of the opening mechanism of FIG. 12;

FIG. 14 illustrates another cross-section showing further detail of the conveyor system of FIG. 12;

FIG. 16 illustrates a more detailed view of a third gasket in the conveyor system of FIG. 12; and FIG. 17 shows the conveyor system of FIG. 12 when in operation.

DETAILED DESCRIPTION

Generally, the present disclosure is directed to a linear motor conveyor system intended to be used in an environment that requires reduced levels of contaminants and that can be cleaned regularly and efficiently, such as a clean, aseptic or sterile environment. The conveyor system is modular, including track sections that can be connected together. The track sections include straight sections and curved sections. The track sections themselves may also be modular. The conveyor system further includes a cover which is configured to seal internal portions of each track section or of the overall track. The cover can include a track cover, which covers the track, and a top plate and cover, which covers the internal portions or interior area of the track sections. The top plate and/or top cover can be removable.

In order to form a seal, the conveyor system includes a plurality of gaskets. The gaskets may be provided between the top cover and the top plate, the track cover and the track section, the top plate and the track section, the track cover and a base of the track section, or the like.

Figure 1:
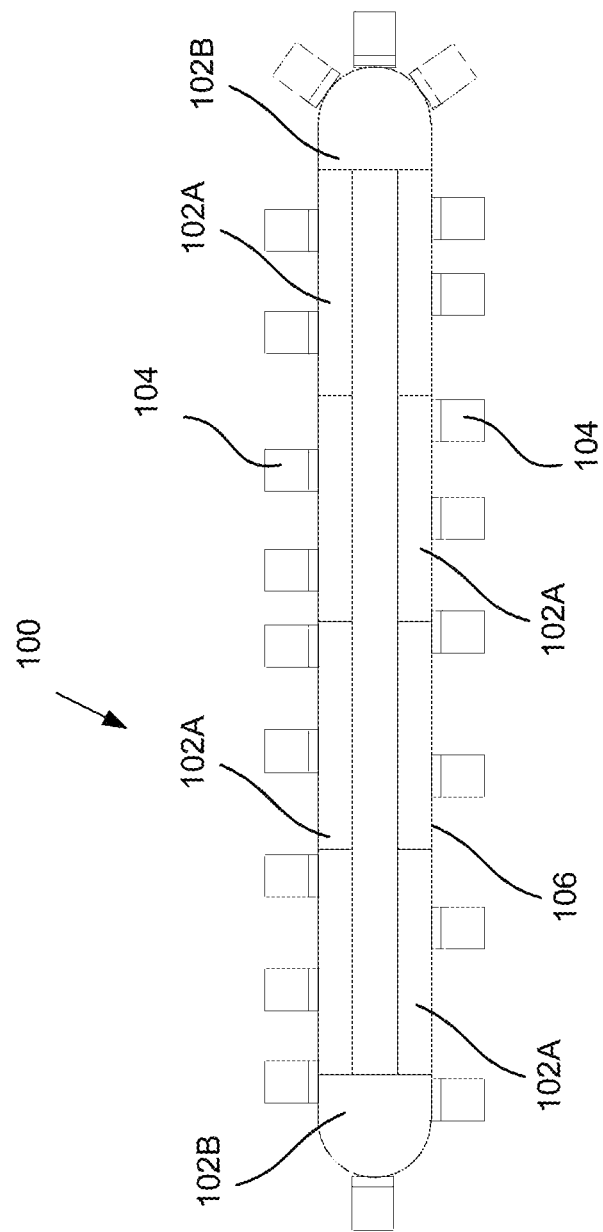
FIG. 1 illustrates a linear motor conveyor system having one or more track sections.

FIG. 1 illustrates an example of a general linear motor conveyor system 100 having one or more track sections 102A, 102B. The linear motor conveyor system 100 may include one or more moving elements 104 which are configured to ride or travel along a track 106 defined by the exterior surfaces of the track sections 102A, 102B. In FIG. 1, there are eight straight track sections 102A, and two corner track sections 102B. Some of the principles of operation of a similar type of linear motor conveyor system are described in more detail in U.S. Pat. No. 8,397,896 to Kleinikkink et al., which is hereby incorporated herein by reference.

In the example of FIG. 1, the plurality of track sections 102A, 102B are mechanically self-contained and separable from one another so as to be modular in nature. The track sections 102A, 102B may be mounted on a base/support (not shown, in this case, below the track sections) so as to align and abut one another in order to form the longer complete track 106. In order to be modular, each track section 102 may house electronic or mechanical circuitry for powering and controlling the track section 102.

The conveyor system 100, via at least some of the track sections 102A, 102B, produces a magnetic force configured to capture, support and/or hold the moving element 104 on the track 106 and move the moving element around the track 106.

Figure 2:
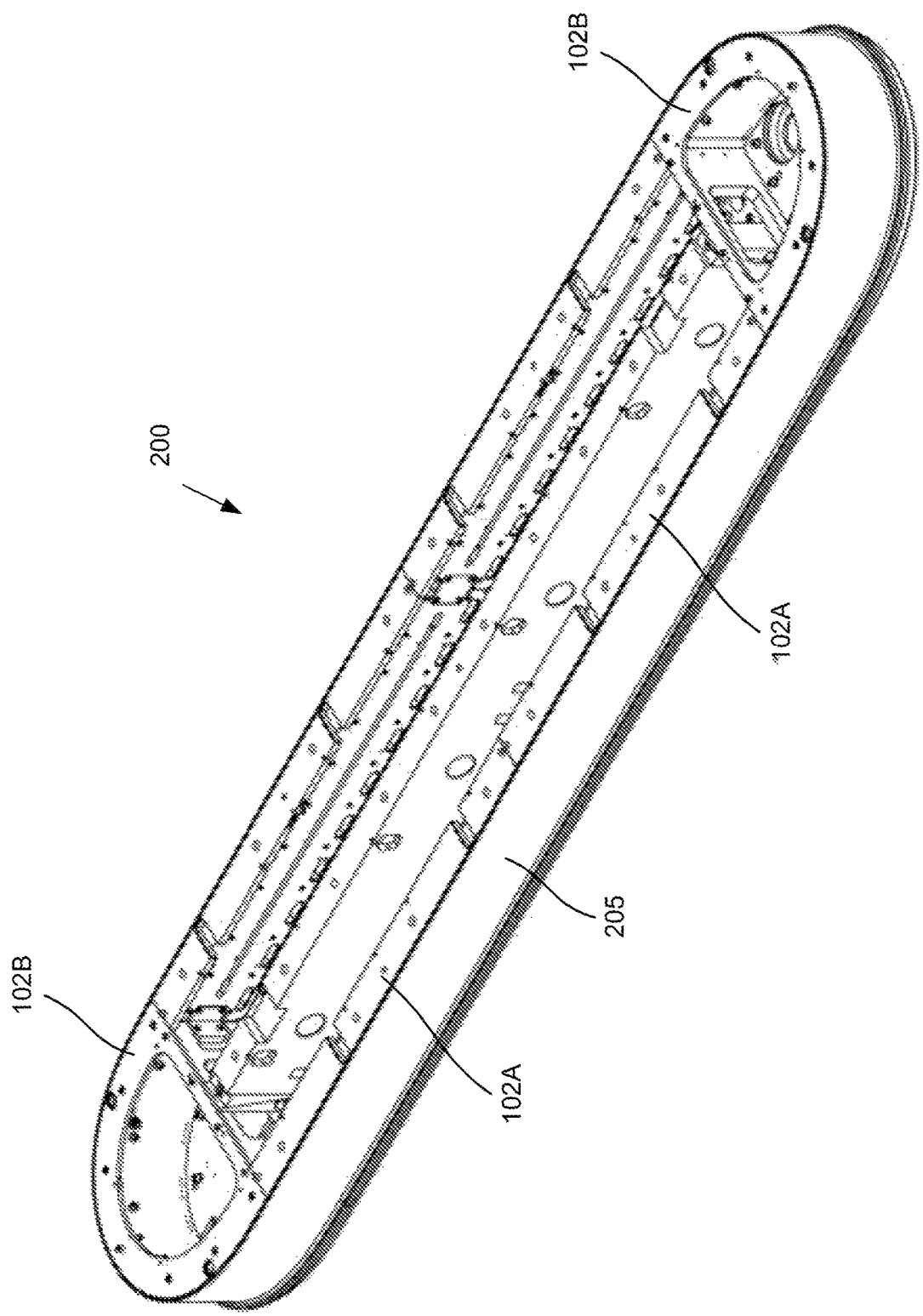
FIG. 2 illustrates an embodiment of an improved linear motor conveyor system for use in an aseptic environment showing a track cover.

FIG. 2 illustrates a conveyor system 200 according to an embodiment herein. The conveyor system of FIG. 2 has some similar elements to that shown in FIG. 1. For ease of reference, this description will use similar reference numbers for similar elements within the figures and embodiments. The conveyor system 200 includes track sections 102A, 102B, and, different from the conveyor system of FIG. 1, includes a track cover 205 configured to cover all or a portion of the track 106. FIG. 2 shows the internal structure of the track sections 102A and 102B. The track cover 205 is configured to cover over joints between and among the track sections 102A and track sections 102B. The track cover 205 is intended to be as continuous as possible to reduce the number of joints required, in some cases, the track cover may be a continuous loop with only one joint (to create the loop), which may be sealed by, for example, welding or the like. The track cover 205 is intended to be capable of being put under tension and, in some cases, may be somewhat flexible. The track cover 205 is preferably a material that can tolerate the cleaning products used in an aseptic environment and is easy to clean and keep clean. In some cases, the track cover 205 may be a belt of stainless steel or the like.

Figure 3:
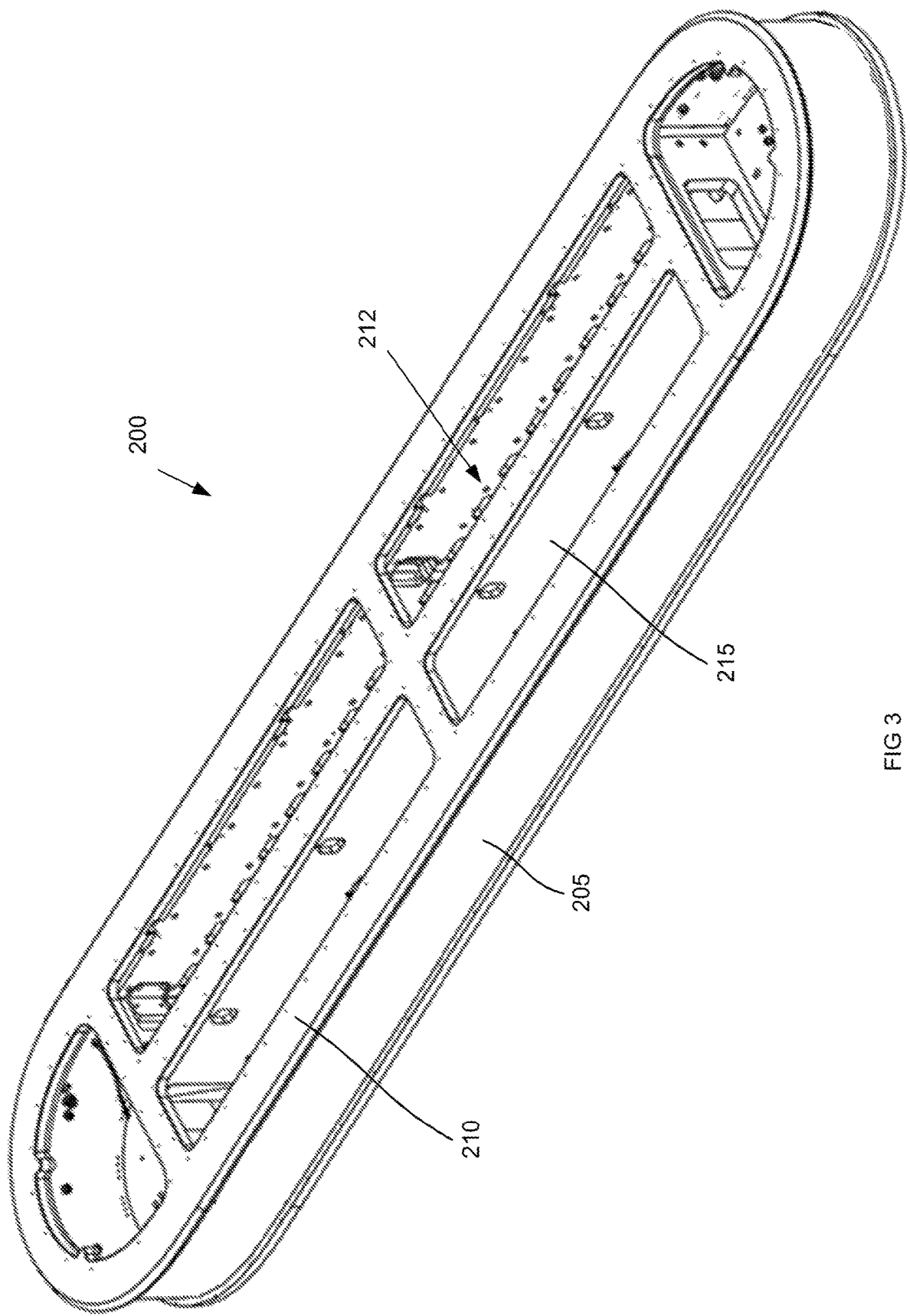
FIG. 3 illustrates the conveyor system of FIG. 2 further including a top plate.

FIG. 3 illustrates the conveyor system 200 further including a top plate 210 configured to cover top edges of the track sections 102A, 102B and cover at least some of an interior area 212 of the conveyor system 100. In this case, the top plate 210 includes a plurality of openings 215 allowing access to the interior area 212 of the conveyor system 200. In this embodiment, the top plate 210 is configured to have an overhang or lip that extends over the track cover 205. In this way, the top plate 210 can assist with maintaining tension on the track cover 205 and help hold the track cover 205 in place.

Figure 4:
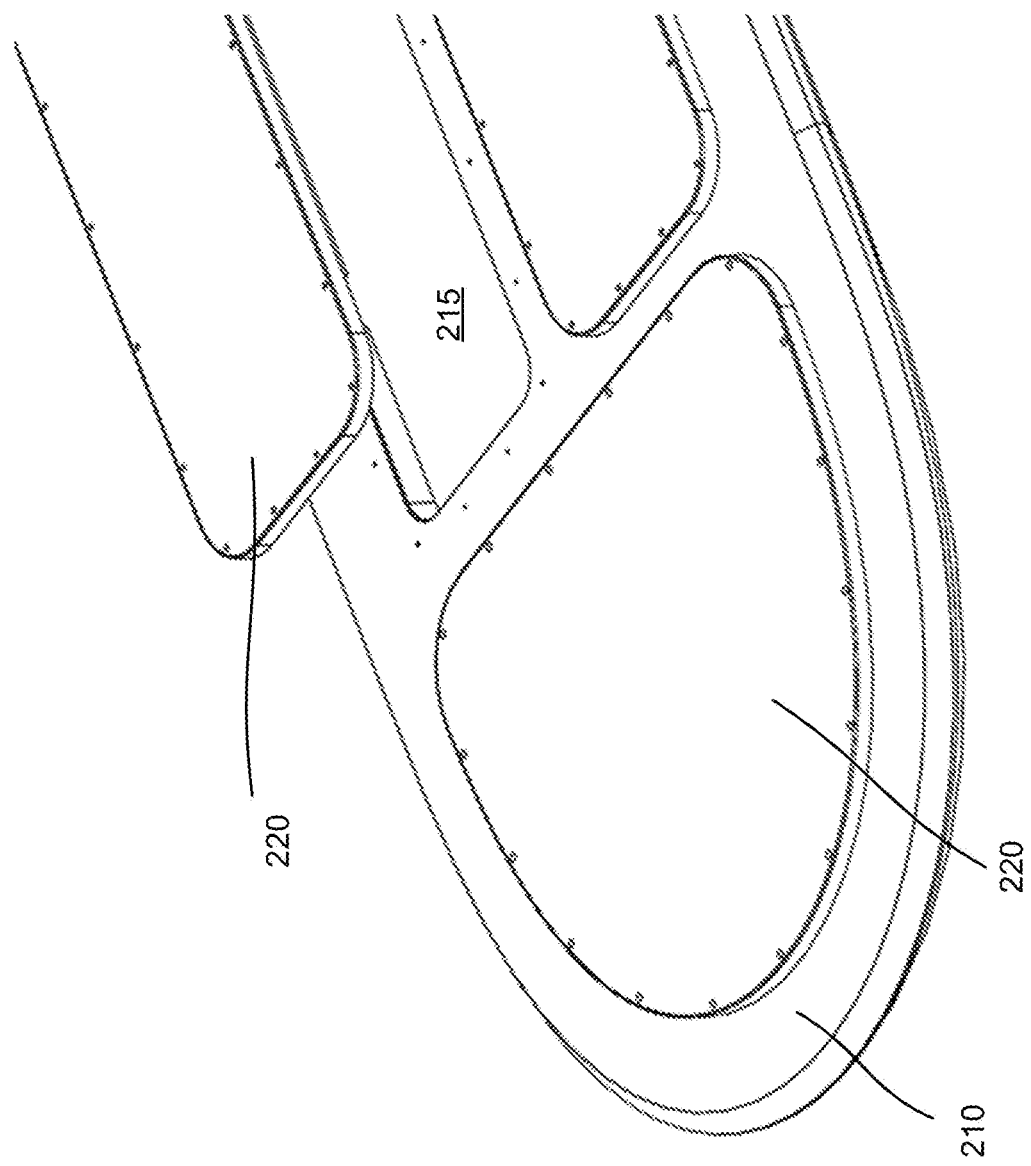
FIG. 4 illustrates a detailed view of top covers for one or more holes/openings in the top plate of FIG. 3.

FIG. 4 illustrates a plurality of top covers 220 for the one or more holes 215 in the top plate 210. FIG. 5 illustrates a situation where a single top cover 520 is configured to be contiguous (or made of sections that form a contiguous cover) and cover portions of the top plate 210 and the interior area 212 of the conveyor system 200 more completely. In either the case of FIG. 4 or FIG. 5, as shown in FIG. 6 with reference to FIG. 5, the top cover 520 can be provided with a first gasket 525 for providing a seal between the top cover 520 and the top plate 210. In general, the first gasket 525 and other gaskets referred to herein may be formed of an elastomer and are configured to avoid "3D" intersections, such as shown in FIG. 6. In some cases, the gaskets may include a coving and seal approach. In some cases, the top cover may be connected to the top plate via connectors such as screws or the like to assist with compressing the gasket.

FIG. 7 illustrates a further embodiment of a conveyor system 700 in which an opening mechanism 705 is provided to allow the top cover 520 to open and close in order to provide access to the interior area 212 of the conveyor system 700. The conveyor system of FIG. 7 has some similar elements to that shown in FIG. 2. For ease of reference, this description will use similar reference numbers for similar elements within the figures and embodiments.

In FIG. 7, some elements of the conveyor system 700, including the track cover 205 and track section 102A, have been removed to better illustrate the opening mechanism 705. As illustrated, the top cover 520 can be opened and closed from the top plate 210 by using pistons 710 and, for example, springs 715. It will be understood that different opening mechanisms may be used, including hydraulics, pneumatics, or the like. In this embodiment, the opening mechanism 705 is in the interior area 212 of the conveyor system 700.

FIG. 8 illustrates a cross-section showing further detail of the opening mechanism 705 of FIG. 7. As in FIG. 7, the sides of the conveyor system 700, including the track cover 205 and track section 102A, have been removed to better show the first gasket 225 and the opening mechanism 705. The pistons 710 feed through a base 720 of the conveyor system 700, using, for example, a sleeve 725 or the like. The top plate 210 can be secured to a top of the track section (not shown) and the top cover 520 opens and closes from the top plate 210 when the pistons 710 are operated.

FIG. 9 illustrates a cross-section showing further detail of the conveyor system 700. In FIG. 9, the sides of the conveyor system 700, including the track cover 205 and the track section 102A are shown. In this embodiment, the top plate 210 is sealed in relation to a top of the track section 102A via a second gasket 730, which, in this embodiment, is placed between the track cover 205, the track section 102A and the top plate 210. Further, a bottom of the track cover 205 can be sealed to the base 720 via a third gasket 735, which, in this case, is held in place by a bracket 740.

FIG. 10 illustrates a more detailed view of the second gasket 730. The second gasket 730 seals the top plate 210 in relation to the track section 102A and the track cover 205.

FIG. 11 illustrates a more detailed view of the third gasket 735. The third gasket 735 can be configured to provide a smooth exterior surface rather than a right angled joint where the track cover 205 meets the base 720 of the conveyor system 700. This is intended to improve the ability to clean an exterior of the conveyor system 700 since dirt, dust or other particulates or the like won't be able to accumulate in the corner formed between the track cover 205 and the base 720.

FIG. 12 illustrates a further embodiment of a conveyor system 1200 having an alternate gasket arrangement. The conveyor system of FIG. 12 has some similar elements to that shown in FIG. 7. For ease of reference, this description will use similar reference numbers for similar elements within the figures and embodiments. In FIG. 12, the top cover 520 can also be opened and closed from the top plate 210 by using the pistons 710. In this embodiment, the opening mechanism 705 is also in the interior area 212 of the conveyor system 700.

FIG. 13 illustrates a cross-section showing further detail of the opening mechanism 705 of FIG. 12. The pistons 710 feed through the base 720 of the conveyor system 700, using the sleeve 725. The top plate 210 can be secured to a top of the track section (not shown) and the top cover 520 opens and closes from the top plate 210 when the pistons 710 are operated.

FIG. 14 illustrates a cross-section showing further detail of the conveyor system 1200. In this embodiment, the top plate 210 is sealed in relation to a top of the track section 102A via the second gasket 730. Further, a bottom of the track cover 205 can be sealed to the base 720 via the third gasket 735. In this case, the third gasket 735 is held in place by a flange or protrusion 1205 provided to the base 720.

Figure 15:
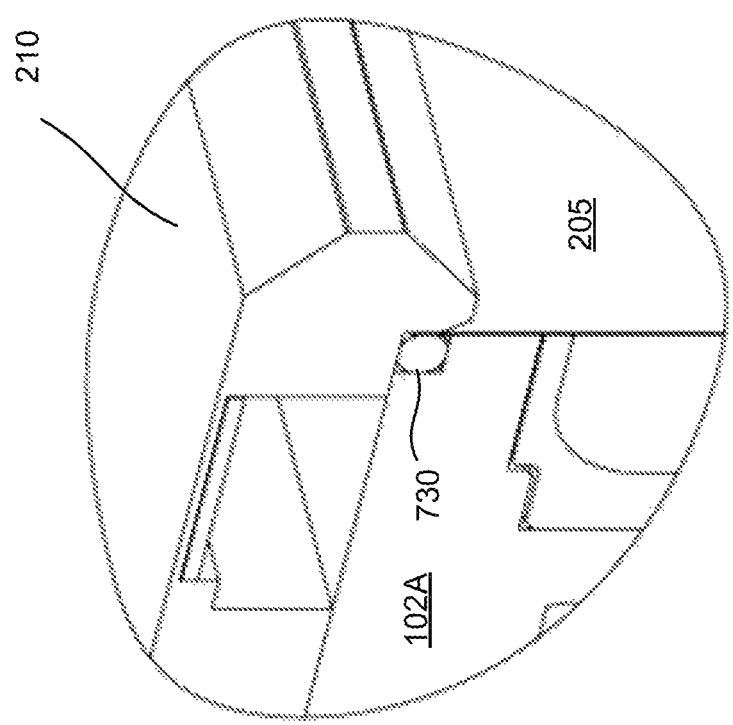
FIG. 15 illustrates a more detailed view of a second gasket in the conveyor system of FIG. 12.

FIG. 15 illustrates a more detailed view of the second gasket 730. The second gasket 730 seals the top plate 210 in relation to the track section 102A and the track cover 205.

FIG. 16 illustrates a more detailed view of the third gasket 735. The third gasket 735 can be configured to provide a relatively smooth exterior surface rather than a right angled joint where the track cover 205 meets the base 720 of the conveyor system 700. The third gasket is held in place by the flange or protrusion 1205 in a coving and seal arrangement. As shown in FIG. 16, the base 720 may also be sealed to a structure 1210 adjacent to the base 720 by a fourth gasket 1215, similar to the first gasket 525 or the like.

FIG. 17 illustrates the conveyor system 700 in a closed position and including moving elements 104. Supporting structure below the conveyor system has been removed to show the opening mechanism 705.

Embodiments herein are intended to provide a conveyor system that can be sealed such that the conveyor system can be easily cleaned on the exterior while protecting the interior from the cleaning agents and the like used to clean the exterior. Further, the conveyor system is configured to be opened/closed to allow access to the interior for maintenance on the electronic and mechanical elements of the track sections.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

We claim:

1. A linear motor conveyor system comprising:
a plurality of track sections comprising a track and the plurality of track sections defining an interior area;
a track cover covering the track of the plurality of track sections;
a top plate covering the interior area of the plurality of track sections wherein the top plate comprises an overhang that engages with an edge of the track cover;
at least one track cover gasket providing a seal between the track cover and the track;
at least one top plate gasket providing a seal between the top plate and the plurality of track sections such that the interior area of the plurality of track sections is sealed, wherein the overhang engages with an edge of the track cover and is configured to compress the at least one top plate gasket between the top plate and the track cover and also compress the track cover gasket between the track cover and the track.

2. A linear motor conveyor system according to claim 1, wherein the track cover is configured to cover any joints between track sections.

3. A linear motor conveyor system according to claim 1, wherein the top plate is configured to cover a portion of the interior area while leaving one or more openings to allow access to the interior.

4. A linear motor conveyor system according to claim 3, further comprising a top cover configured to cover at least one of the one or more openings in the top plate and comprises one or more top cover gaskets between the top cover and the top plate around the one or more openings being covered.

5. A linear motor conveyor system according to claim 1, wherein the track cover gasket is configured to form a seal between an edge of the track cover and a base of each of the plurality of track sections.

6. A linear motor conveyor system according to claim 1, further comprising an opening mechanism configured to open the top plate to allow for maintenance.

7. A linear motor conveyor system according to claim 6, wherein the opening mechanism comprises at least one piston provided to at least one of the plurality of track sections, wherein the piston can be raised and lowered to open the top plate.

8. A linear motor conveyor system comprising:
a base;
a plurality of track sections mounted on the base, each track section comprising a track and the plurality of track sections defining an interior area;
a track cover covering the tracks of the plurality of track sections, wherein the track cover comprises a strong, flexible material configured to wrap along or around the track;
a top plate covering the interior area of the plurality of track sections; and
at least one first gasket providing a seal between the top plate and plurality of track sections.

9. A linear motor conveyor system according to claim 8, further comprising a second gasket providing a seal between the track cover and the base and wherein the track cover is configured to cover any joints between track sections.

10. A linear motor conveyor system according to claim 9, wherein the top plate comprises an overhang that engages with the track cover and is configured to compress the second gasket via pressure on the track cover.

11. A linear motor conveyor system according to claim 10, wherein the second gasket is configured to form a seal between an edge of the track cover and a base of the track section.

12. A linear motor conveyor system according to claim 8, wherein the top plate is configured to cover a portion of the interior area while leaving at least one opening to allow access to the interior area and further comprising at least one top cover covering at least a portion of the top plate and the at least one opening and a second gasket providing a seal between the top plate and the top cover.

13. A linear motor conveyor system according to claim 8, wherein the top plate comprises an overhang that engages with the plurality of track sections and is configured to compress the at least one first gasket between the top plate and the plurality of track sections.

14. A linear motor conveyor system according to claim 8, further comprising an opening mechanism configured to open the top plate to allow for maintenance.

15. A linear motor conveyor system according to claim 14, wherein the opening mechanism comprises at least one piston provided to at least one of the plurality of track sections, wherein the piston can be raised and lowered to open the top plate.

* * * * *